United States Patent
Sumida

(10) Patent No.: US 9,874,831 B2
(45) Date of Patent: Jan. 23, 2018

(54) OPTICAL SCANNING APPARATUS AND IMAGE FORMING APPARATUS INCLUDING THE SAME

(71) Applicant: CANON KABUSHIKI KAISHA, Tokyo (JP)

(72) Inventor: Noa Sumida, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/356,162

(22) Filed: Nov. 18, 2016

(65) Prior Publication Data

US 2017/0153565 A1 Jun. 1, 2017

(30) Foreign Application Priority Data

Nov. 26, 2015 (JP) ................................. 2015-231167

(51) Int. Cl.
| | |
|---|---|
| *G03G 15/043* | (2006.01) |
| *H04N 1/00* | (2006.01) |
| *H04N 1/028* | (2006.01) |
| *H04N 1/29* | (2006.01) |

(52) U.S. Cl.
CPC ....... *G03G 15/043* (2013.01); *H04N 1/00816* (2013.01); *H04N 1/0283* (2013.01); *H04N 1/29* (2013.01)

(58) Field of Classification Search
CPC ............. G03G 15/043; H04N 1/00816; H04N 1/0283; H04N 1/29
See application file for complete search history.

(56) References Cited

U.S. PATENT DOCUMENTS

| | | | |
|---|---|---|---|
| 2003/0169327 A1 | 9/2003 | Kato | |
| 2007/0159520 A1* | 7/2007 | Tanimura | G02B 26/125 347/225 |
| 2011/0285804 A1* | 11/2011 | Esumi | B41J 2/473 347/224 |
| 2015/0035930 A1* | 2/2015 | Ishihara | B41J 2/471 347/118 |
| 2015/0365554 A1* | 12/2015 | Kawana | H04N 1/02885 358/474 |
| 2016/0246210 A1* | 8/2016 | Fujii | G03G 15/043 |

FOREIGN PATENT DOCUMENTS

| | | |
|---|---|---|
| EP | 1158334 A2 | 11/2001 |
| JP | 09-33850 A | 2/1997 |
| JP | 2006-154748 A | 6/2006 |
| JP | 2007-045094 A | 2/2007 |
| JP | 2015-031824 A | 2/2015 |
| JP | 2015-034870 A | 2/2015 |

* cited by examiner

*Primary Examiner* — Rodney Bonnette
(74) *Attorney, Agent, or Firm* — Canon USA Inc., IP Division

(57) ABSTRACT

An optical scanning apparatus includes a light source, a deflector configured to deflect a light flux from this light source to scan a surface to be scanned in a main-scanning direction, an incident optical system configured to guide the light flux from the light source to a deflection surface of the deflector, and an imaging optical system configured to guide the light flux deflected by the deflector to the surface to be scanned. The optical scanning apparatus satisfies the following conditions: $0.5<|\beta si|<2.2$, $3.0<|\beta so|<10.0$, and $0.2<Li/Lo<0.4$.

11 Claims, 5 Drawing Sheets

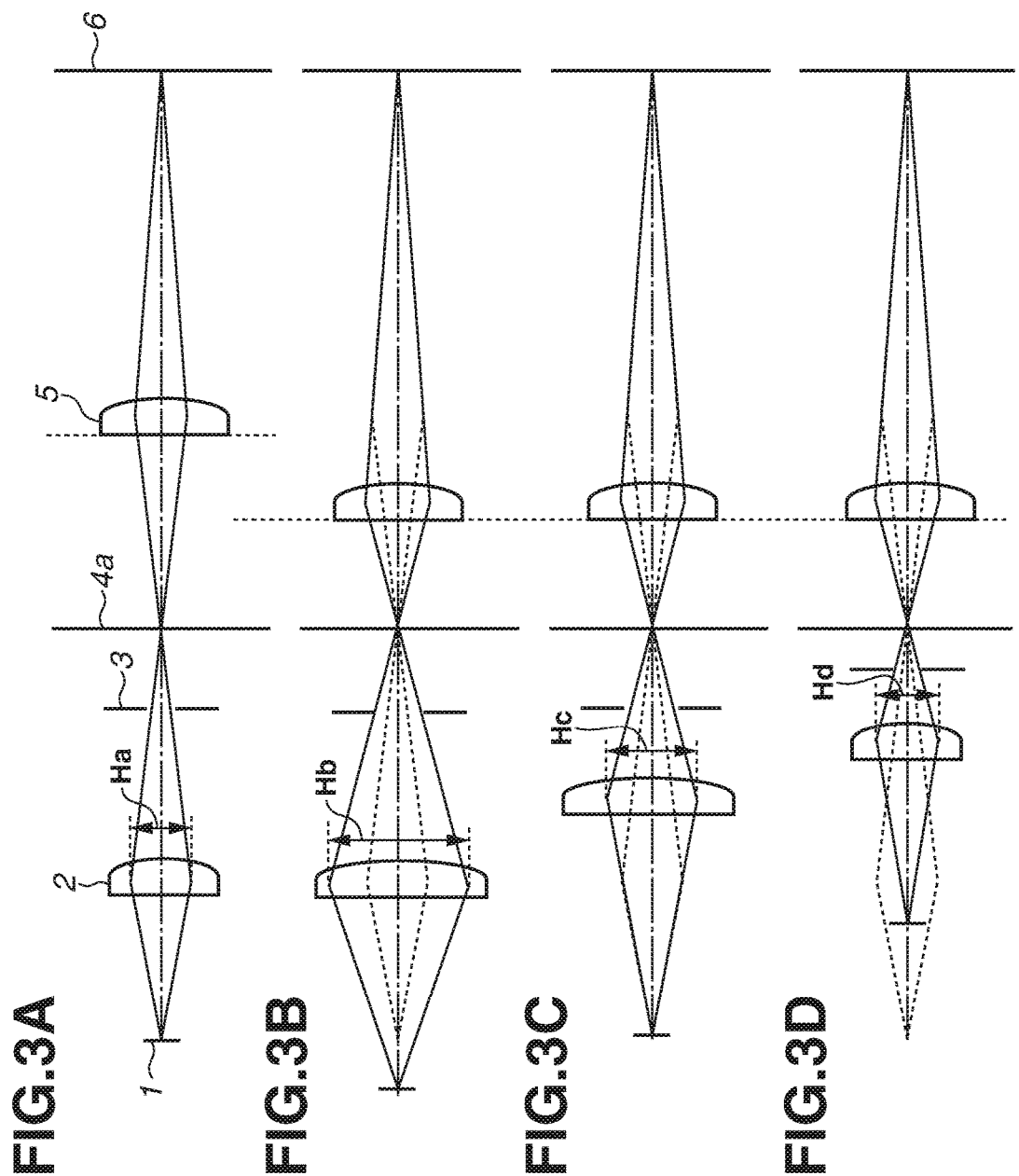

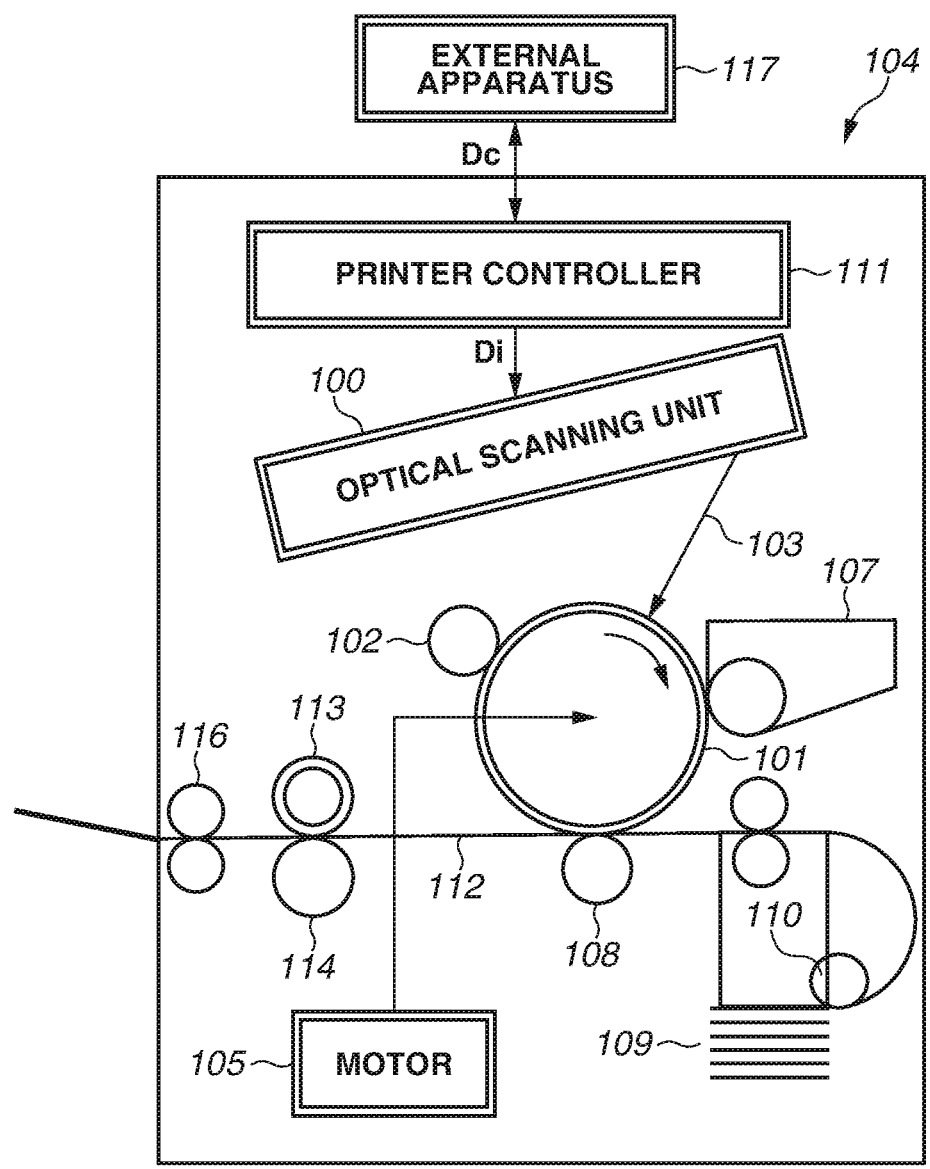

OPTICAL SCANNING APPARATUS AND IMAGE FORMING APPARATUS INCLUDING THE SAME

BACKGROUND OF THE INVENTION

Field of the Invention

The present invention relates to an optical scanning apparatus, and to an optical scanning apparatus effectively usable together with an image forming apparatus, such as a laser beam printer (LBP), a digital copying machine, and a multifunction printer (a printer equipped with multiple functions).

Description of the Related Art

There is known an optical scanning apparatus including an incident optical system, which guides a light flux emitted from a light source to a deflector, and an imaging optical system, which guides the light flux deflected by the deflector to a surface to be scanned, as an optical scanning apparatus for use in an image forming apparatus. Japanese Patent Application Laid-Open No. 2015-31824 discusses an optical scanning apparatus configured in such a manner that the imaging optical system is disposed closer to the deflector, which contributes to reductions in a length of the imaging optical system in a main-scanning direction and a length of the entire apparatus in an optical-axis direction, thus realizing reductions in a size and cost.

Now, the image forming apparatus requires an area for placing other members, such as a toner container, whereby it is difficult to reduce a distance between the imaging optical system and the surface to be scanned. Therefore, reducing the distance between the deflector and the imaging optical system, like the configuration discussed in Japanese Patent Application Laid-Open No. 2015-31824, leads to a necessity of increasing a lateral magnification of the imaging optical system in a sub-scanning cross-section (a sub-scanning magnification). Therefore, this configuration ends up increasing a sensitivity of the optical performance to a variation in the imaging optical system at the time of the formation thereof. That is, the configuration increases the amount of a change in optical performance according to a variation in the imaging optical system at the time of manufacture, and an assembly error in each member such as the light source.

In this case, one possible method for solving this problem is to reduce a sub-scanning magnification of the incident optical system to thereby reduce a sub-scanning magnification of the entire optical system, thus preventing or reducing the increase in the sensitivity of the optical performance. However, simply increasing a distance between the light source and the incident optical system to achieve that leads to a necessity of enlarging the incident optical system in the sub-scanning direction, making it difficult to reduce a size of the incident optical system.

SUMMARY OF THE INVENTION

The present invention is directed to realizing the reduction in the size while reducing the sensitivity of the optical performance in the optical scanning apparatus.

According to an aspect of the present invention, an optical scanning apparatus includes a light source, a deflector configured to deflect a light flux from the light source to optically scan a surface to be scanned in a main-scanning direction, an incident optical system configured to guide the light flux from the light source to a deflection surface of the deflector, and an imaging optical system configured to guide the light flux deflected by the deflector to the surface to be scanned. The optical scanning apparatus satisfies the following conditions: $0.5<|\beta si|<2.2$, $3.0<|\beta so|<10.0$, and $0.2<Li/Lo<0.4$, where $\beta si$ represents a magnification of the incident optical system in a sub-scanning cross-section, $\beta so$ represents a magnification of the imaging optical system in the sub-scanning cross-section, Li represents a distance between the light source and the deflection surface on an optical axis, and Lo represents a distance between the deflection surface and the surface to be scanned on the optical axis.

Further features of the present invention will become apparent from the following description of exemplary embodiments with reference to the attached drawings.

BRIEF DESCRIPTION OF THE DRAWINGS

FIGS. 3A-3D illustrate effects of the exemplary embodiment of the present invention.

FIG. 5 is a cross-sectional view illustrating main portions of an image forming apparatus according to an exemplary embodiment of the present invention.

DESCRIPTION OF THE EMBODIMENTS

Figure 1A:
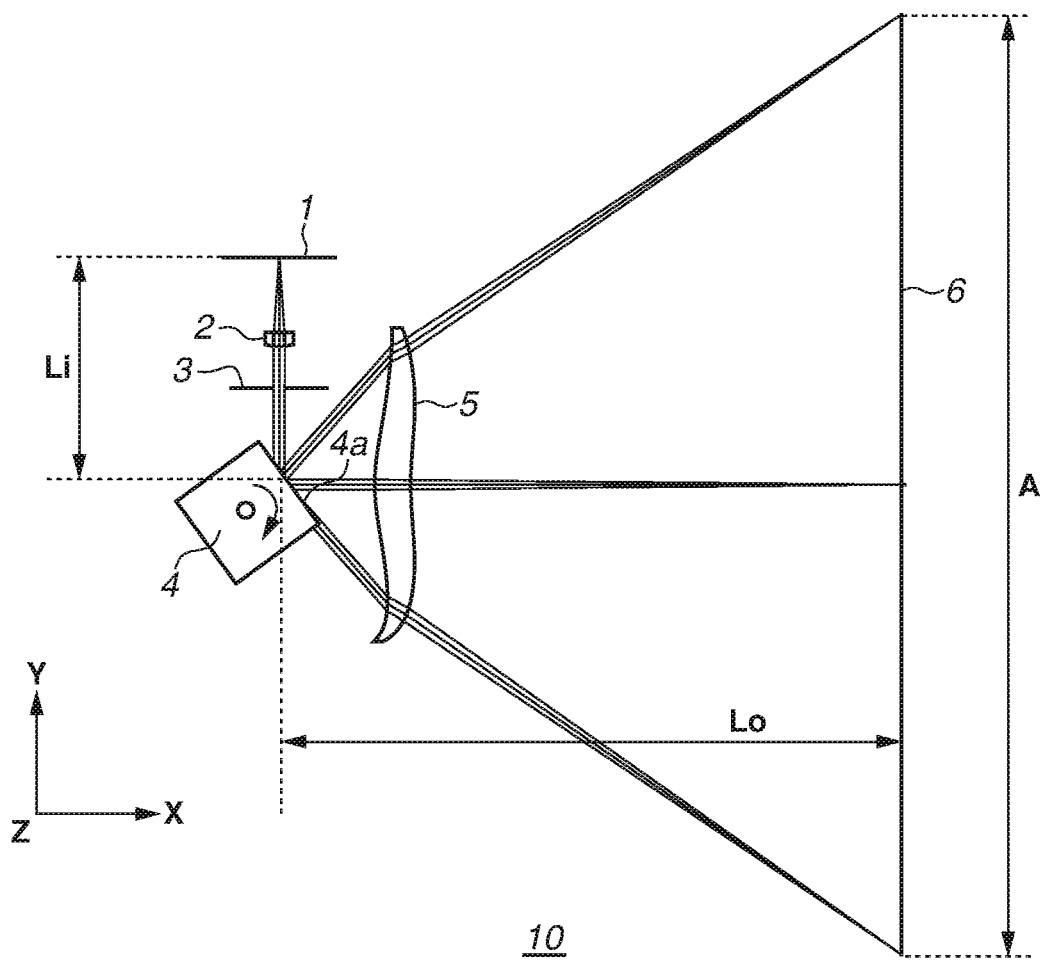
FIGS. 1A and 1B are cross-sectional views illustrating main portions of an optical scanning apparatus according to a first exemplary embodiment of the present invention.

In the following description, typical exemplary embodiments of the present invention will be described with reference to the drawings. Each of the drawings may be drawn at a different scale from actual dimensions for the sake of convenience. Further, the same members will be identified by the same reference numerals in each of the drawings, and a redundant description will be omitted.

In the following description, a main-scanning direction refers to a direction perpendicular to a rotational axis (or an axis of a swinging motion) of a deflector and perpendicular to an optical-axis direction of an imaging optical system. The main-scanning direction is a direction in which a surface to be scanned is optically scanned by the deflector. A sub-scanning direction refers to a direction in parallel with the rotational axis or the axis of the swinging motion of the deflector. Further, a main-scanning cross-section refers to a cross-section including an optical axis and parallel with the main-scanning direction, i.e., a cross-section perpendicular to the sub-scanning direction. A sub-scanning cross-section refers to a cross-section in parallel with the optical axis of the imaging optical system and the sub-scanning direction, i.e., a cross-section perpendicular to the main-scanning direction.

Figure 1B:
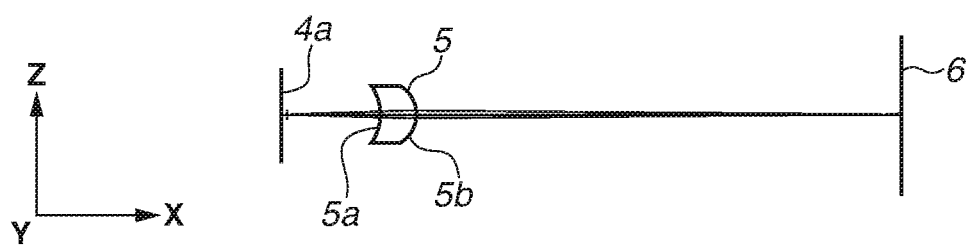

FIGS. 1A and 1B are cross-sectional views illustrating main portions of an optical scanning apparatus 10 according to a first exemplary embodiment of the present invention. FIGS. 1A and 1B illustrate a view of the main-scanning cross-section (an XY cross-sectional view), and a view of the sub-scanning cross-section (a ZX cross-sectional view) including the optical axis of the imaging optical system, respectively. The optical scanning apparatus 10 according to the present exemplary embodiment includes a light source 1, an incident optical system 2, an aperture stop 3, a deflector 4, and an imaging optical system 5, and is an apparatus that optically scans a surface to be scanned 6 by deflecting a light flux with use of the deflector 4. FIG. 1B partially illustrates a portion from a deflection surface 4a of the deflector 4 to the surface to be scanned 6. The optical scanning apparatus 10 may employ such a configuration that a deflecting mirror (a reflection member) is disposed in an optical path from the deflection surface 4a to the surface to be scanned 6, by which the optical path is deflected in the sub-scanning cross-section.

In the optical scanning apparatus 10, the light flux emitted from the light source 1, after passing through the incident optical system 2, is formed into an elliptical shape by the aperture stop 3 including an elliptical aperture, and is incident on the deflection surface 4a of the deflector 4. For example, a semiconductor laser can be used as the light source 1, and the number of light emitting points thereof may be one or plural. In the present exemplary embodiment, the elliptical aperture stop including the elliptical aperture is employed as the aperture stop 3, but the shape of the aperture is not limited thereto. For example, a rectangular aperture stop including a rectangular aperture may be employed as the aperture stop 3.

The incident optical system 2 is an anamorphic collimator lens having positive refracting power in the main scanning cross-section, and converts the light flux into substantially parallel light in the main scanning cross-section. The substantially parallel light here includes not only precisely parallel light but also weakly convergent light and weakly divergent light. Then, the incident optical system 2 condenses the light flux on or around the deflection surface 4a in the sub-scanning cross-section to form a line image elongated in the main-scanning direction on the deflection surface 4a.

The deflector 4 is rotated by a driving unit (not illustrated) at a constant speed in a direction from the incident optical system 2 to the imaging optical system 5 in the main-scanning cross-section, as indicated by an arrow illustrated in the drawing. The deflector 4 deflects the light flux from the aperture stop 3 by the deflection surface 4a to optically scan an effective scanning area (a printing area) on the surface to be scanned 6 in the main-scanning direction via the imaging optical system 5. In the present exemplary embodiment, a rotational polygonal mirror (a polygon mirror) having four deflection surfaces is employed as the deflector 4, but the number of deflection surfaces is not limited thereto. Further, a swingable mirror having one or two deflection surface(s) swingable around an axis of a swinging motion may be employed instead of the rotational polygonal mirror.

The imaging optical system 5 includes a single imaging optical element (an imaging lens), and guides and condenses the light flux deflected by the deflection surface 4a onto the surface to be scanned 6 to form an image of the light source 1 on or around the surface to be scanned 6 in both the main-scanning cross-section and the sub-scanning cross-section. The imaging optical system 5 has two optical surfaces (lens surfaces), namely, an incident surface (a first surface) 5a and an emission surface (a second surface) 5b. The imaging optical system 5 is configured to allow the surface to be scanned 6 to be scanned at an even speed with the light flux deflected by the deflection surface 4a, i.e., to satisfy the fθ characteristic in the main-scanning cross-section. Further, the imaging optical system 5 establishes a conjugate relationship between the deflection surface 4a or the vicinity thereof and the surface to be scanned 6 or the vicinity thereof in the sub-scanning cross-section, thereby reducing a shift of a scanning position on the surface to be scanned 6 in the sub-scanning direction when the deflection surface 4a tilts (optical face tangle error compensation).

In the present exemplary embodiment, each of the incident optical system 2 and the imaging optical system 5 includes a single optical element, but each of them may include a plurality of optical elements if necessary. For example, the incident optical system 2 may include two optical elements, a collimator lens and an anamorphic lens. However, it is desirable that each of the incident optical system 2 and the imaging optical system 5 includes the single optical element to realize reductions in a size and cost of the entire apparatus.

Further, each of the incident optical system 2 and the imaging optical system 5 according to the present exemplary embodiment is a plastic molded lens formed by injection molding, but is not limited thereto and may be a glass lens. Further, in the case where each of the incident optical system 2 and the imaging optical system 5 includes the plurality of optical elements, they may be constructed by combining the glass lens and the plastic molded lens. However, it is desirable to employ the plastic molded lens, which makes it easy to form a diffractive surface and an aspherical shape and is suited for mass-production, to improve productivity and an optical performance.

A configuration of the optical scanning apparatus 10 according to the present exemplary embodiment is indicated in a table 1. An on-axis deflection point in the table 1 refers to a point at which, when the light flux from the light source 1 is incident on a position of an on-axis image height of the surface to be scanned 6, a principal ray of this light flux and the deflection surface 4a intersect with each other.

TABLE 1

| Configuration of Optical Scanning Apparatus 10 | | | | | Shape of Imaging Optical System 5 | |
|---|---|---|---|---|---|---|
| Wavelength of | | | | | | |
| Light Emitted from Light Source 1 | λ (nm) | 793 | | | First Surface 5a | Second Surface 5b |
| Full Width at Half Maximum of Emission Power of Light Source 1 in Main-scanning Cross-section | θy0 (degrees) | 12.0 | Generatrix | R | 4.18817E+01 | 7.92957E+01 |

TABLE 1-continued

| Configuration of Optical Scanning Apparatus 10 | | | Shape of Imaging Optical System 5 | | |
|---|---|---|---|---|---|
| Wavelength of Light Emitted from Light Source 1 | λ (nm) | 793 | | First Surface 5a | Second Surface 5b |
| Full Width at Half Maximum of Emission Power of Light Source 1 in Sub-scanning Cross-section | θz0 (degrees) | 28.0 | K | 1.07018E−02 | 1.74792E−01 |
| Light Emitting Point of Light Source 1 to First Surface of Incident Optical System 2 | d1 (mm) | 17.130 | B2u | 0.00000E+00 | 0.00000E+00 |
| Phase Coefficient of First Surface of Incident Optical System 2 | c20 | −0.01590 | B4u | −2.26747E−05 | −1.35662E−05 |
| | c02 | −0.01923 | B6u | 2.53129E−08 | 8.14720E−09 |
| Curvature Radius of First Surface of Incident Optical System 2 in Main-scanning Cross-section | rm1 (mm) | ∞ | B8u | −1.79111E−11 | 1.04646E−12 |
| Curvature Radius of First Surface of Incident Optical System 2 in Sub-scanning Cross-section | rs1 (mm) | ∞ | B10u | 1.57355E−15 | −4.95825E−15 |
| Curvature Radius of Second Surface of Incident Optical System 2 in Main-scanning Cross-section | rm2 (mm) | −19.494 | B12u | 6.44818E−18 | 9.81450E−19 |
| Curvature Radius of Second Surface of Incident Optical System 2 in Sub-scanning Cross-section | rs2 (mm) | −10.269 | B14u | −3.81572E−21 | 2.10114E−21 |
| Thickness of Incident Optical System 2 (First Surface to Second Surface) | d2 (mm) | 3.000 | B16u | 4.87250E−25 | −1.02587E−24 |
| Refractive Index of Incident Optical System 2 (Wavelength 793 nm) | n1 | 1.524 | B2l | 0.00000E+00 | 0.00000E+00 |
| Second Surface of Incident Optical System 2 to Aperture Stop 3 | d3 (mm) | 9.674 | B4l | −2.49314E−05 | −1.52005E−05 |
| Aperture Stop 3 to On-axis Deflection Point 4a | d4 (mm) | 21.316 | B6l | 3.21501E−08 | 1.20512E−08 |
| On-axis Deflection Point 4a to First Surface of Imaging Optical System 5 | d5 (mm) | 21.727 | B8l | −2.82904E−11 | −3.36092E−12 |
| Thickness of Imaging Optical System 5 (First Surface to Second Surface) | d6 (mm) | 8.200 | B10l | 3.99815E−15 | −4.21180E−15 |

TABLE 1-continued

| Configuration of Optical Scanning Apparatus 10 | | | Shape of Imaging Optical System 5 | | |
|---|---|---|---|---|---|
| Wavelength of Light Emitted from Light Source 1 | λ (nm) | 793 | | First Surface 5a | Second Surface 5b |
| Refractive Index of Imaging Optical System 5 (Wavelength 793 nm) | n2 | 1.524 | B12l | 1.20823E−17 | 5.22500E−19 |
| Second Surface of Imaging Optical System 5 to Surface to be scanned 6 | d7 (mm) | 111.570 | B14l | −8.89569E−21 | 3.39867E−21 |
| Incident Angle in Main-scanning Cross-section with respect to Deflection Surface 4a | α (degrees) | 90.0 | B16l | 1.67336E−24 | −1.85070E−24 |
| Circumradius of Deflector 4 | Rpol (mm) | 20.0 | Sagittal r | −1.13555E+01 | −7.52695E+00 |
| Number of Surfaces of Deflector 4 | men | 4 | E2u | 3.32017E−04 | 1.97014E−04 |
| Aperture Diameter of Aperture Stop 3 (Main-scanning × Sub-scanning) | Ellipse (mm) | 2.50 × 1.13 | E4u | −7.57131E−07 | −4.15336E−07 |
| Sub-scanning Magnification of Incident Optical System 2 | βsi | −1.76 | E6u | 1.91421E−09 | 7.92255E−10 |
| Sub-scanning Magnification of Imaging Optical System 5 | βso | −3.42 | E8u | −3.64238E−12 | −7.59646E−13 |
| Sub-scanning Magnification of Entire Optical System | βs | 6.02 | E10u | 4.09678E−15 | −2.97457E−17 |
| Light Emitting Point of Light Source 1 to Deflection Surface 4a (Entire Length of Incident Optical System 2) | Li (mm) | 51.12 | E12u | −2.25387E−18 | 7.89723E−19 |
| On-axis Deflection Point 4a to Surface to be scanned 6 (Entire Length of Imaging Optical System 5) | Lo (mm) | 141.50 | E14u | 2.47160E−22 | −7.06168E−22 |
| Effective Scanning Width (Printing Width) | A (mm) | 210 | E16u | 1.79255E−25 | 2.14E−25 |
| | | | E2l | 2.73438E−04 | 1.81406E−04 |
| | | | E4l | −5.99376E−07 | −3.72419E−07 |
| | | | E6l | 1.05016E−09 | 6.07121E−10 |
| | | | E8l | −2.31347E−12 | −3.45667E−13 |
| | | | E10l | 4.29335E−15 | −1.43528E−15 |
| | | | E12l | −3.20044E−18 | 3.78072E−18 |
| | | | E14l | −5.12567E−22 | −3.42008E−21 |
| | | | E16l | 1.08971E−24 | 1.05E−24 |
| | | | E1 | −0.000640724 | −0.000287529 |

A shape x of each of the optical surfaces of the imaging optical system 5 according to the present exemplary embodiment is defined by the following expressions (1) to (4), when an origin, an X axis, a Y axis, and a Z axis are set to an intersection point between the optical surface and the optical axis, the X axis extending in the optical-axis direction, the Y axis orthogonal to the optical axis in the main-scanning cross-section, and the Z axis orthogonal to the optical axis in the sub-scanning cross-section, respectively.

$$x = X + S \tag{1}$$

$$X = \frac{\frac{Y^2}{R}}{1 + \sqrt{1 - (1+K_y)\left(\frac{Y}{R}\right)^2}} + \sum_{n=1}^{8} B_{2ni} Y^{2n} \tag{2}$$

-continued $$S = \frac{\frac{z^2}{r'}}{1 + \sqrt{1 - (1+K_z)\left(\frac{z}{r'}\right)^2}} \quad (3)$$

$$r' = r\left(1 + \sum_{n=1}^{16} E_{ni} Y^n\right) \quad (4)$$

The expression (2) indicates a shape of the optical surface in the main-scanning cross-section (a generatrix shape), and the expression (3) indicates a shape of the optical surface in the sub-scanning cross-section (a sagittal shape) at a position of an image height Y. In this case, as indicated in the expression (4), a curvature radius r' of the optical surface in the sub-scanning cross-section changes according to a value of Y. In the expressions (2) and (4), each aspheric surface coefficient is set assuming that Y corresponds to "upper" in the case of Y>0 and "lower" in the case of Y<0. Then, each aspheric surface coefficient is indicated in the table 1 with i set to i=u in the case of "upper" and i=1 in the case of "lower".

The incident surface of the incident optical system 2 according to the present exemplary embodiment is a diffractive surface where a diffractive grating is formed, and a phase function Φ of the diffractive grating is expressed by the following expression (5), when k represents a diffraction order (k=1 in the present exemplary embodiment) and λ represents a design wavelength.

$$\phi = \frac{2\Pi}{\lambda} k \sum_{i,j^c i,j} Y^i Z^j \quad (5)$$

When an ambient temperature around the optical scanning apparatus 10 changes, this change causes changes in the wavelength of the light flux emitted from the light source 1, and the shape, the refractive index, and the like of each of the optical surfaces, thus resulting in a change in a focus of each of the optical systems. Therefore, in the present exemplary embodiment, the plastic molded lens is employed as the incident optical system 2 and the optical surface thereof is formed as the diffractive surface, which allows the incident optical system 2 to compensate the focus change due to the change in the ambient temperature. For example, if the ambient temperature increases relative to a normal temperature, the power (the refracting power) of the optical surface of the incident optical system 2 is attenuated due to the elongated wavelength of the light flux and the extended plastic material. On the other hand, power of the diffractive surface is enhanced due to the elongated wavelength of the light flux, which allows the focus changes due to the refractive surface and the diffractive surface to cancel out each other.

Figure 2A:
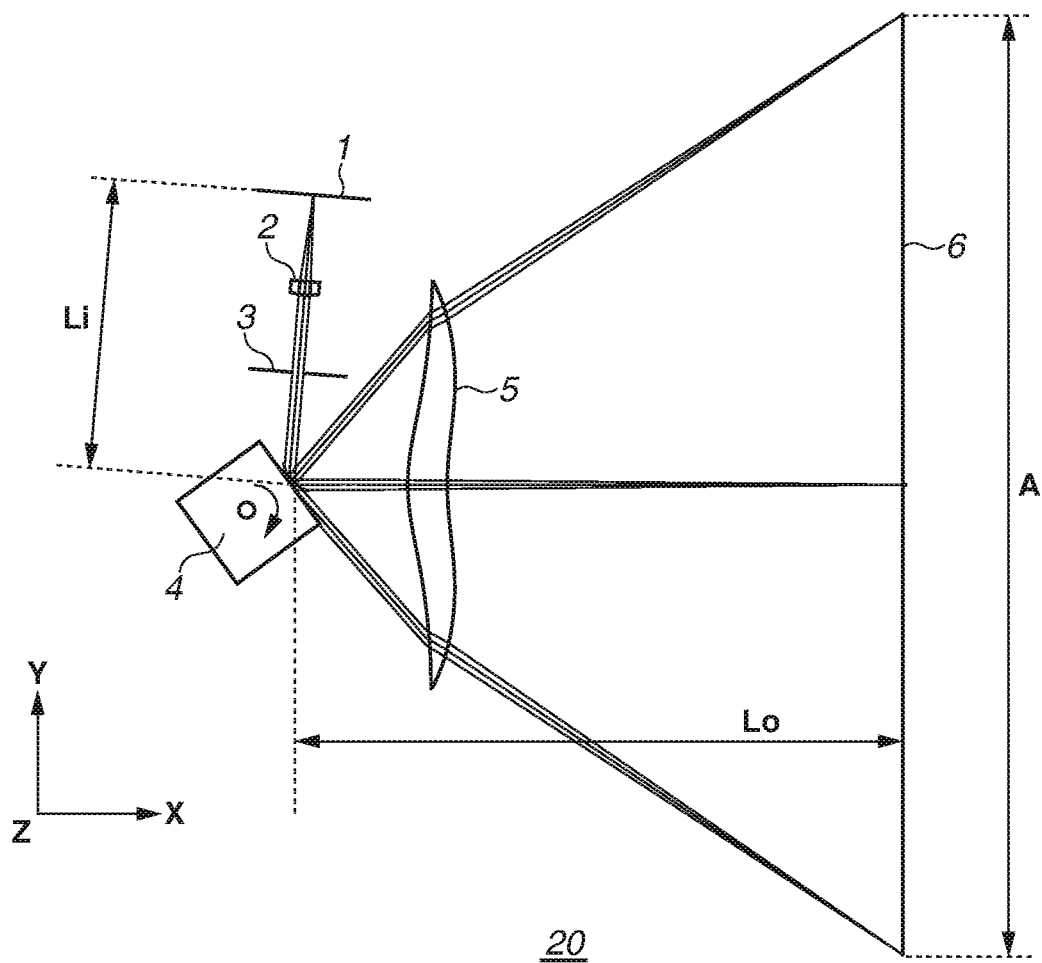
FIGS. 2A and 2B are cross-sectional views illustrating main portions of an optical scanning apparatus according to a comparative example.
Figure 2B:
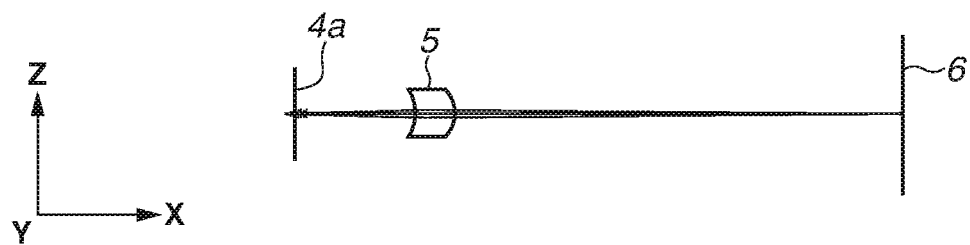

Next, effects of the present exemplary embodiment will be described with use of a comparative example. FIGS. 2A and 2B are cross-sectional views illustrating main portions of an optical scanning apparatus 20 according to the comparative example, and FIGS. 2A and 2B illustrate a view of a main-scanning cross-section, and a view of a sub-scanning cross-section including the optical axis of the imaging optical system 5, respectively. A configuration of the optical scanning apparatus 20 according to the comparative example is illustrated in a table 2.

TABLE 2

| Configuration of Optical Scanning Apparatus 20 | | | | Shape of Imaging Optical System 5 | |
|---|---|---|---|---|---|
| Wavelength of | | | | | |
| Light Emitted from Light Source 1 | λ (nm) | 790 | | First Surface 5a | Second Surface 5b |
| Full Width at Half Maximum of Emission Power of Light Source 1 in Main-scanning Cross-section | θy0 (degrees) | 12.0 | Generatrix R | 4.30160E+01 | 6.73080E+01 |
| Full Width at Half Maximum of Emission Power of Light Source 1 in Sub-scanning Cross-section | θz0 (degrees) | 28.0 | K | −1.69440E−01 | 7.84030E−01 |
| Light Emitting Point of Light Source 1 to First Surface of Incident Optical System 2 | d1 (mm) | 20.208 | B2u | 0.00000E+00 | 0.00000E+00 |
| Curvature Radius of First Surface of Incident Optical System 2 in Main-scanning Cross-section | rm1 (mm) | 27.387 | B4u | −1.57440E−0.5 | −1.11700E−05 |

TABLE 2-continued

| Configuration of Optical Scanning Apparatus 20 | | | Shape of Imaging Optical System 5 | | |
|---|---|---|---|---|---|
| Wavelength of Light Emitted from Light Source 1 | λ (nm) | 790 | | First Surface 5a | Second Surface 5b |
| Curvature Radius of First Surface of Incident Optical System 2 in Sub-scanning Cross-section | rs1 (mm) | 16.919 | B6u | 1.17900E−08 | 5.48320E−09 |
| Curvature Radius of Second Surface of Incident Optical System 2 in Main-scanning Cross-section | rm2 (mm) | −16.420 | B8u | −6.00679E−12 | −1.54620E−12 |
| Curvature Radius of Second Surface of Incident Optical System 2 in Sub-scanning Cross-section | rs2 (mm) | −13.872 | B10u | 1.29380E−15 | 2.91110E−17 |
| Thickness of Incident Optical System 2 (First Surface to Second Surface) | d2 (mm) | 3.000 | B12u | −1.14320E−21 | 3.70670E−20 |
| Refractive Index of Incident Optical System 2 (Wavelength 793 nm) | n1 | 1.524 | B14u | −2.62050E−23 | −5.17290E−24 |
| Second Surface of Incident Optical System 2 to Aperture Stop 3 | d3 (mm) | 25.902 | B16u | −1.07850E−26 | 2.01900E−29 |
| Aperture Stop 3 to On-axis Deflection Point 4a | d4 (mm) | 26.000 | B2l | 0.00000E+00 | 0.00000E+00 |
| On-axis Deflection Point 4a to First Surface of Imaging Optical System 5 | d5 (mm) | 26.6000 | B4l | −1.57280E−05 | −1.11700E−05 |
| Thickness of Imaging Optical System 5 (First Surface to Second Surface) | d6 (mm) | 9.000 | B6l | 1.15030E−08 | 5.48320E−09 |
| Refractive Index of Imaging Optical System 5 (Wavelength 793 nm) | n2 | 1.524 | B8l | −5.49756E−12 | −1.54620E−12 |
| Second Surface of Imaging Optical System 5 to Surface to be scanned 6 | d7 (mm) | 103.542 | B10l | 9.34710E−16 | 2.91110E−17 |
| Incident Angle in Main-scanning Cross-section with respect to Deflection Surface 4a | α (degrees) | 85.0 | B12l | 5.93020E−20 | 3.70670E−20 |
| Circumradius of Deflector 4 | Rpol (mm) | 20.0 | B14l | 1.75860E−23 | −5.17290E−24 |
| Number of Surfaces of Deflector 4 | men | 4 | B16l | −2.69340E−26 | 2.01900E−29 |
| Aperture Diameter of Aperture Stop 3 (Main-scanning × Sub-scanning) | Ellipse (mm) | 2.64 × 1.02 | Sagittal r | −1.41000E+01 | −8.57480E+00 |
| Sub-scanning Magnification of Incident Optical System 2 | βsi | −2.40 | J2u | 2.09050E−04 | 1.45830E−04 |
| Sub-scanning Magnification of Imaging Optical System 5 | βso | −2.40 | J4u | −2.20560E−07 | −1.91560E−07 |

TABLE 2-continued

| Configuration of Optical Scanning Apparatus 20 | | | Shape of Imaging Optical System 5 | | |
|---|---|---|---|---|---|
| Wavelength of Light Emitted from Light Source 1 | λ (nm) | 790 | | First Surface 5a | Second Surface 5b |
| Sub-scanning Magnification of Entire Optical System | βs | 5.75 | J6u | 3.66710E−11 | 2.11130E−10 |
| Light Emitting Point of Light Source 1 to Deflection Surface 4a (Entire Length of Incident Optical System 2) | Li (mm) | 75.11 | J8u | 1.16760E−13 | −1.56470E−13 |
| On-axis Deflection Point 4a to Surface to be scanned 6 (Entire Length of Imaging Optical System 5) | Lo (mm) | 139.14 | J10u | −6.07110E−17 | 5.37590E−17 |
| Effective Scanning Width (Printing Width) | A (mm) | 210 | J12u | −1.13590E−21 | 1.31160E−20 |
| | | | J14u | 3.89310E−24 | −8.78110E−24 |
| | | | J16u | 0.00000E+00 | 0.00E+00 |
| | | | J2l | 2.03340E−04 | 1.45830E−04 |
| | | | J4l | −2.12270E−07 | −1.91560E−07 |
| | | | J6l | 3.64720E−11 | 2.11130E−10 |
| | | | J8l | 1.12594E−13 | −1.56470E−13 |
| | | | J10l | −6.25550E−17 | 5.37590E−17 |
| | | | J12l | 2.37280E−21 | 1.31160E−20 |
| | | | J14l | 3.09510E−24 | −8.78110E−24 |
| | | | J16l | 0.00000E+00 | 0.00E+00 |

The shape x of each of the optical surfaces of the imaging optical system 5 according to the comparative example is expressed by the above-described expressions (1) to (3) and the following expression (6).

$$1/r' = 1/r(1 + \Sigma_{n=1}^{16} J_{n\,i} Y^n) \quad (6)$$

As understood from a comparison between FIG. 1A and the table 1, and FIG. 2A and the table 2, the distance between the deflector 4 and the imaging optical system 5 can be shorter and the width of the imaging optical system 5 in the main-scanning direction can be narrower in the present exemplary embodiment than the comparative example. On the other hand, it is difficult to reduce the distance Lo between the deflection surface 4a and the surface to be scanned 6 on the optical axis (the distance between the axial deflection point and the surface to be scanned 6) because of a necessity of securing an area for placing a toner container and the like, whereby this distance is almost equal between the present exemplary embodiment and the comparative example. Therefore, the absolute value |βso| of the sub-scanning magnification of the imaging optical system 5 is larger in the present exemplary embodiment than the comparative example as this value is 3.42 times in the present exemplary embodiment while being 2.40 times in the comparative example.

Reducing the absolute value |βsi| of the sub-scanning magnification of the incident optical system 2 can reduce the absolute value |βs| of the sub-scanning magnification of the entire optical system from the light source 1 to the surface to be scanned 6, thus reducing sensitivity of the optical performance. However, simply increasing the distance between the light source 1 and the incident optical system 2 for the purpose of reducing the absolute value |βsi| of the sub-scanning magnification of the incident optical system 2 leads to a necessity of enlarging the incident optical system 2 in the sub-scanning direction.

This problem will be described with reference to FIGS. 3A-3D. A configuration in FIG. 3A is a schematic drawing illustrating a sub-scanning cross-section when the entire optical system according to the comparative example is developed so as to be lined up on the same axis, and configurations in FIGS. 3B and 3C are configurations in which the distance between the deflection surface 4a and the imaging optical system 5 is reduced from the configuration in the first row, respectively. Further, a configuration in FIG. 3D is a schematic diagram illustrating a sub-scanning cross-section when the entire optical system according to the present exemplary embodiment is developed so as to be lined up on the same axis.

The configuration in FIG. 3B, compared to the configuration in FIG. 3A, places the light source 1 farther away from the incident optical system 2 while maintaining an f-number (Fno) of the imaging optical system 5 on a scanning side that faces the surface to be scanned 6, thereby reducing the absolute value |βsi| of the sub-scanning magnification of the incident optical system 2. Further, the configuration in FIG. 3C, compared to the configuration in FIG. 3A, places the incident optical system 2 closer to the deflection surface 4a, thereby reducing the absolute value |βsi| of the sub-scanning magnification of the incident optical system 2.

Comparing an optical path (a broken line) before the change is made to the configuration in FIG. 3A and an optical path (a solid line) after the change is made to the configuration in FIG. 3A in each of the configurations in FIGS. 3B and 3C, a light flux width Hb or Hc on the optical path indicated by the solid line is greater than a light flux width Ha on the optical path indicated by the broken line. In other words, this comparison reveals that, if the sub-scanning magnification of the incident optical system 2 is reduced while the distance between the deflection surface 4a and the imaging optical system 5 is reduced from the configuration in FIG. 3A, this results in the enlargement of the incident optical system 2 in the sub-scanning direction.

Now, for simplification of the description, suppose that the absolute values $|\beta so|$ and $|\beta si|$ are $|\beta so|=|\beta si|=2$ in the configuration in FIG. 3A, and then the distance between the deflection surface 4a and the imaging optical system 5 is changed from this configuration, so that the absolute value $|\beta so|$ increases to $|\beta so|=3$. In this case, the absolute value $|\beta si|$ should be changed to $|\beta si|=1.33$ to keep the absolute value $|\beta s|$ of the sub-scanning magnification of the entire optical system unchanged between before the change and after the change. In this case, the light flux width Hb on the emission surface of the incident optical system 2 is Hb=4.17 mm in the configuration in FIG. 3B, and is substantially 1.5 times wider than the light flux width Ha=2.78 mm before the change is made to the configuration in FIG. 3A. Further, the light flux width Hc on the emission surface of the incident optical system 2 is Hc=3.61 mm in the configuration in FIG. 3C, and is substantially 1.3 times wider than the light flux width Ha.

In this manner, simply reducing the absolute value $|\beta si|$ of the sub-scanning magnification of the incident optical system 2 results in the enlargement of the incident optical system 2 in the sub-scanning direction. In the present exemplary embodiment, this problem is solved by appropriately setting the sub-scanning magnifications of the incident optical system 2 and the imaging optical system 5 and a layout of each of the members. Specifically, the optical scanning apparatus 10 according to the present exemplary embodiment satisfies the following conditional expressions (7) to (9), when Li represents the distance between the light source 1 and the deflection surface 4a on the optical axis, i.e., the distance between the light emitting point of the light source 1 and the on-axis deflection point.

$$0.5<|\beta si|<2.2 \quad (7)$$

$$3.0<|\beta so|<10.0 \quad (8)$$

$$0.2<Li/Lo<0.4 \quad (9)$$

The conditional expression (7) indicates that the sub-scanning magnification of the incident optical system 2 is small to some degree, i.e., the incident optical system 2 is disposed at a position that is close to the deflection surface 4a to some degree. The conditional expression (8) indicates that the sub-scanning magnification of the imaging optical system 5 is large to some degree, i.e., the imaging optical system 5 is disposed at a position that is close to the deflection surface 4a to some degree. Further, the conditional expression (9) indicates that the light source 1 is disposed at a position that is close to the deflection surface 4a to some degree.

If the sub-scanning magnification of the incident optical system 2 falls below a lower limit defined by the conditional expression (7), the incident optical system 2 is disposed too close to the deflection surface 4a, which makes it difficult to manufacture the optical scanning apparatus 10. If the sub-scanning magnification of the incident optical system 2 exceeds an upper limit defined by the conditional expression (7), the sub-scanning magnification of the incident optical system 2 becomes too large, which makes it difficult to reduce the sensitivity of the optical performance.

Further, if the sub-scanning magnification of the imaging optical system 5 falls below a lower limit defined by the conditional expression (8), the imaging optical system 5 is disposed too far away from the deflection surface 4a, which makes it difficult to reduce the size of the entire apparatus in the optical-axis direction. If the sub-scanning magnification of the imaging optical system 5 exceeds an upper limit defined by the conditional expression (8), the imaging optical system 5 is disposed too close to the deflection surface 4a, which makes it difficult to manufacture the optical scanning apparatus 10.

Further, if the relationship between the distances Li and Lo falls below a lower limit defined by the conditional expression (9), the light source 1 is disposed too close to the incident optical system 2, which makes it difficult to manufacture the optical scanning apparatus 10. Further, if the relationship between the distances Li and Lo exceeds an upper limit defined by the conditional expression (9), the light source 1 is disposed too far away from the incident optical system 2, which makes it difficult to prevent or reduce the enlargement of the incident optical system 2 in the sub-scanning direction.

In this manner, by satisfying the conditional expressions (7) to (9), the optical scanning apparatus 10 according to the present exemplary embodiment can achieve both the reduction in the size of the imaging optical system 5 and the prevention or reduction in the enlargement of the incident optical system 2 while reducing the sub-scanning magnification of the entire optical system, thereby realizing the reduction in the size of the entire apparatus. This effect allows the optical scanning apparatus 10 to reduce material cost (achieve cost-cutting) regarding each of the optical systems while reducing the sensitivity of the optical performance of the entire optical system.

As indicated by the configuration in FIG. 3D, in the entire optical system according to the present exemplary embodiment, both the light source 1 and the incident optical system 2 are disposed closer to the deflection surface 4a compared to the configuration in FIG. 3A, unlike the configurations in FIGS. 3B and 3C. Due to this layout, the configuration in FIG. 3D succeeds in preventing or reducing the enlargement of the incident optical system 2 in the sub-scanning direction while reducing the distance of each of the incident optical system 2 and the imaging optical system 5 to the deflection surface 4a.

Specifically, the value of Li/Lo is 0.36 in the present exemplary embodiment while the value of Li/Lo is 0.54 in the comparative example, which indicates that Li is reduced in the present exemplary embodiment compared to Li in the comparative example. Then, a light flux width Hd on the emission surface of the incident optical system 2 according to the present exemplary embodiment is 2.55 mm, and is significantly narrower compared to Hb and Hc in the configurations in FIGS. 3B and 3C.

To further reduce the sub-scanning magnification of the entire optical system while taking into consideration heat generation due to the rotation of the deflector 4 and an assembly tolerance of each of the members, it is further desirable that the incident optical system 2 satisfies the following conditional expression (10).

$$1.0<|\beta si|<1.9 \quad (10)$$

In the present exemplary embodiment, the absolute value $|\beta si|$ is $|\beta si|=1.76$, and satisfies both the above-described conditional expressions (7) and (10). Therefore, $|\beta s|$ can reduce to as small as 6.02, which is substantially equal to the comparative example. If the incident optical system 2 according to the present exemplary embodiment is replaced with the incident optical system according to the comparative example, the absolute value |βs| increases to |βs|=8.21, resulting in an increase in the sensitivity of the optical performance to the assembly precision of each of the members. Similarly, it is further desirable that the imaging optical system 5 satisfies the following conditional expression (11) if taking into consideration the heat generation due to the rotation of the deflector 4 and the assembly tolerance of each of the members.

$$3.0<|\beta so|<6.0 \tag{11}$$

Further, it is desirable that the optical scanning apparatus 10 according to the present exemplary embodiment satisfies the following conditional expression (12), when A represents the width of the effective scanning area (the effective scanning width) in the main-scanning direction that is targeted for the optical scanning on the surface to be scanned 6.

$$0.38 \leq Lo/A \leq 0.75 \tag{12}$$

If the relationship between the distance Lo and the width A falls below a lower limit defined by the conditional expression (12), this results in a too great width of a maximum scanning field angle (an incident angle with respect to a maximum off-axis image height) when the surface to be scanned 6 is optically scanned by the deflector 4, leading to a necessity of enhancing the power of the imaging optical system 5 and thus making it difficult to manufacture the imaging optical system 5. Further, if the relationship between the distance Lo and the width A exceeds an upper limit defined by the conditional expression (12), the distance between the deflector 4 and the surface to be scanned 6 becomes too long, which makes it difficult to reduce the size of the apparatus.

Further, it is further desirable to satisfy the following conditional expression (13) if taking into consideration ease of the layout and the assembly tolerance of the imaging optical system 5. In the present exemplary embodiment, the relationship between the distance Lo and the width A is Lo/A=0.67, and satisfies both the conditional expressions (12) and (13).

$$0.5 \leq Lo/A \leq 0.75 \tag{13}$$

In this manner, according to the optical scanning apparatus 10 according to the present exemplary embodiment, the reduction in the size can be realized while the sensitivity of the optical performance is reduced.

Figure 4A:
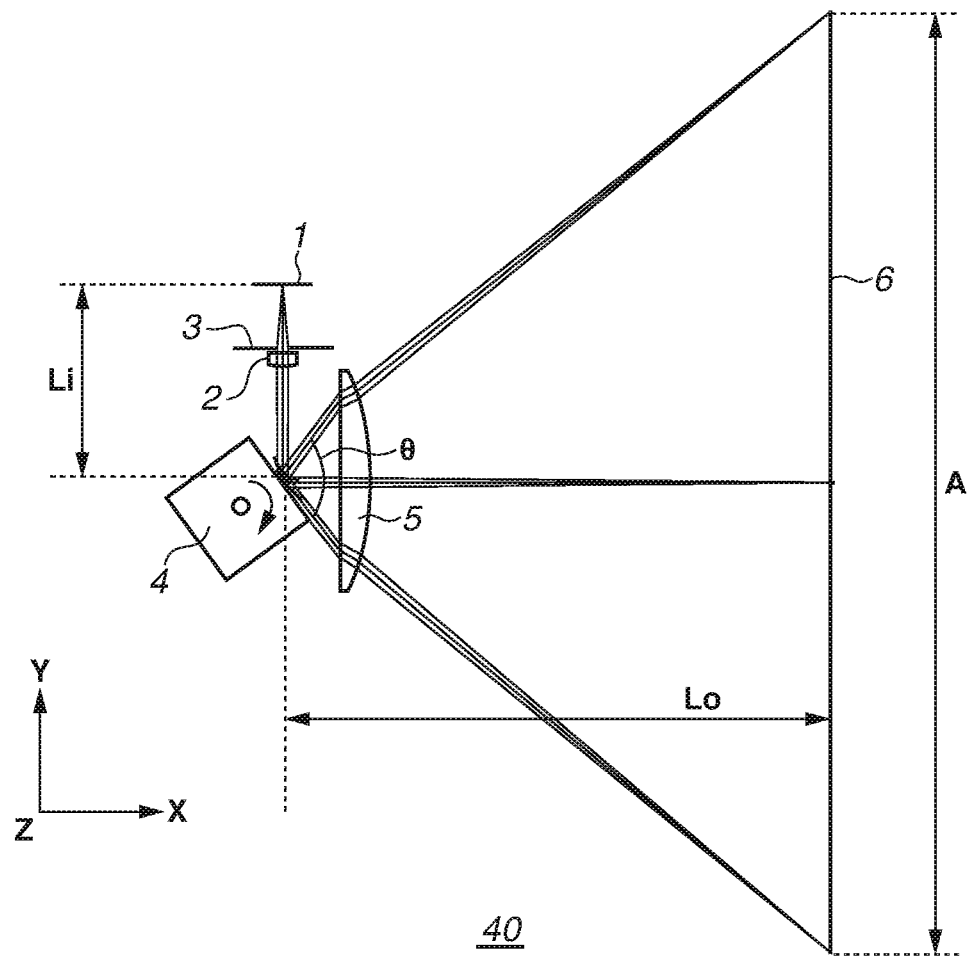
FIGS. 4A and 4B are cross-sectional views illustrating main portions of an optical scanning apparatus according to a second exemplary embodiment of the present invention.
Figure 4B:
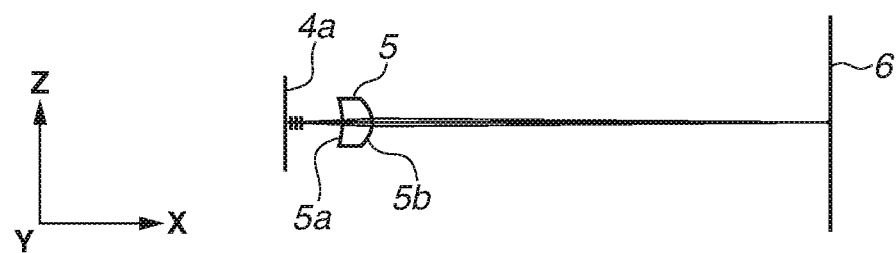

In the following description, an optical scanning apparatus according to a second exemplary embodiment of the present invention will be described in detail. FIGS. 4A and 4B are cross-sectional views illustrating main portions of an optical scanning apparatus 40 according to the present exemplary embodiment, and FIGS. 4A and 4B illustrate a main-scanning cross section and a sub-scanning cross section, respectively. A configuration of the optical scanning apparatus 40 according to the present exemplary embodiment is indicated in a table 3.

TABLE 3

| Configuration of Optical Scanning Apparatus 40 | | | | Shape of Imaging Optical System 5 | |
|---|---|---|---|---|---|
| Wavelength of Light Emitted from Light Source 1 | λ (nm) | 790 | | First Surface 5a | Second Surface 5b |
| Full Width at Half Maximum of Emission Power of Light Source 1 in Main-scanning Cross-section | θy0 (degrees) | 12.0 | Generatrix R | 1.61983E+02 | −8.40269E+01 |
| Full Width at Half Maximum of Emission Power of Light Source 1 in Sub-scanning Cross-section | θz0 (degrees) | 28.0 | K | −2.73112E+02 | 6.07055E+00 |
| Light Emitting Point of Light Source 1 to Aperture Stop 3 | d1 (mm) | 14.359 | B2u | 0.00000E+00 | 0.00000E+00 |
| Aperture Stop 3 to First Surface of Incident Optical System 2 | d2 (mm) | 1.300 | B4u | −1.79213E−05 | −9.61231E−06 |
| Phase Coefficient of First Surface of Incident Optical System 2 | c20 c02 | −0.017 −0.024 | B6u B8u | 5.59212E−08 −7.48095E−11 | 6.42089E−09 2.07852E−11 |
| Curvature Radius of First Surface of Incident Optical System 2 in Main-scanning Cross-section | rm1 (mm) | ∞ | B10u | 3.97387E−14 | −1.99897E−14 |

TABLE 3-continued

| Configuration of Optical Scanning Apparatus 40 | | | Shape of Imaging Optical System 5 | | |
|---|---|---|---|---|---|
| Wavelength of Light Emitted from Light Source 1 | λ (nm) | 790 | | First Surface 5a | Second Surface 5b |
| Curvature Radius of First Surface of Incident Optical System 2 in Sub-scanning Cross-section | rs1 (mm) | ∞ | B12u | 0.00000E+00 | 0.00000E+00 |
| Curvature Radius of Second Surface of Incident Optical System 2 in Main-scanning Cross-section | rm2 (mm) | −19.065 | B14u | 0.00000E+00 | 0.00000E+00 |
| Curvature Radius of Second Surface of Incident Optical System 2 in Sub-scanning Cross-section | rs2 (mm) | −9.532 | B16u | 0.00000E+00 | 0.00000E+00 |
| Thickness of Incident Optical System 2 (First Surface to Second Surface) | d3 (mm) | 3.000 | B2l | 0.00000E+00 | 0.00000E+00 |
| Refractive Index of Incident Optical System 2 (Wavelength 793 nm) | n1 | 1.524 | B4l | −2.20716E−05 | −1.07309E−05 |
| Second Surface of Incident Optical System 2 to On-axis Deflection Point 4a | d4 (mm) | 22.670 | B6l | 5.97017E−08 | 9.08557E−09 |
| On-axis Deflection Point 4a to First Surface of Imaging Optical System 5 | d5 (mm) | 13.000 | B8l | −8.58331E−11 | 6.54348E−12 |
| Thickness of Imaging Optical System 5 (First Surface to Second Surface) | d6 (mm) | 6.800 | B10l | 5.36643E−14 | −7.21817E−15 |
| Refractive Index of Imaging Optical System 5 (Wavelength 793 nm) | n2 | 1.524 | B12l | 0.00000E+00 | 0.00000E+00 |
| Second Surface of Imaging Optical System 5 to Surface to be scanned 6 | d7 (mm) | 105.200 | B14l | 0.00000E+00 | 0.00000E+00 |
| Incident Angle in Main-scanning Cross-section with respect to Deflection Surface 4a | α (degrees) | 90.0 | B16l | 0.00000E+00 | 0.00000E+00 |
| Circumradius of Deflector 4 | Rpol (mm) | 20.0 | Sagittal r | −2.24373E+01 | −6.83989E+00 |
| Number of Surfaces of Deflector 4 | men | 4 | E2u | −1.04917E−04 | 8.80320E−05 |
| Aperture Diameter of Aperture Stop 3 (Main-scanning × Sub-scanning) | Ellipse (mm) | 1.75 × 1.72 | E4u | 2.17482E−07 | −6.69752E−07 |
| Sub-scanning Magnification of Incident Optical System 2 | βsi | −1.56 | E6u | 1.91428E−09 | 1.95876E−09 |
| Sub-scanning Magnification of Imaging Optical System 5 | βso | −5.62 | E8u | −9.60695E−12 | −2.61736E−12 |

TABLE 3-continued

| Configuration of Optical Scanning Apparatus 40 | | | Shape of Imaging Optical System 5 | | |
|---|---|---|---|---|---|
| Wavelength of Light Emitted from Light Source 1 | λ (nm) | 790 | | First Surface 5a | Second Surface 5b |
| Sub-scanning Magnification of Entire Optical System | βs | 8.76 | E10u | 1.16324E−14 | 8.52433E−16 |
| Light Emitting Point of Light Source 1 to Deflection Surface 4a (Entire Length of Incident Optical System 2) | Li (mm) | 41.33 | E12u | 0.00000E+00 | 0.00000E+00 |
| On-axis Deflection Point 4a to Surface to be scanned 6 (Entire Length of Imaging Optical System 5) | Lo (mm) | 125.00 | E14u | 0.00000E+00 | 0.00000E+00 |
| Effective Scanning Width (Printing Width) | A (mm) | 210 | E16u | 0.00000E+00 | 0.00E+00 |
| | | | E2l | −1.04917E−04 | 8.80320E−05 |
| | | | E4l | 2.17482E−07 | −6.69752E−07 |
| | | | E6l | 1.91428E−09 | 1.95876E−09 |
| | | | E8l | −9.60695E−12 | −2.61736E−12 |
| | | | E10l | 1.16324E−14 | 8.52433E−16 |
| | | | E12l | 0.00000E+00 | 0.00000E+00 |
| | | | E14l | 0.00000E+00 | 0.00000E+00 |
| | | | E16l | 0.00000E+00 | 0.00000E+00 |
| | | | E1 | −6.48547E−04 | −4.21532E−04 |
| | | | E3 | 7.36736E−07 | −3.96290E−07 |
| | | | E5 | −2.68503E−09 | −6.47380E−10 |
| | | | E7 | 2.27066E−11 | 7.25995E−12 |
| | | | E9 | −4.08446E−14 | −6.43804E−15 |

The shape of each of the optical surfaces of the imaging optical system 5 according to the present exemplary embodiment is also expressed by the definitional expressions indicated by the expressions (1) to (4), similarly to the first exemplary embodiment. However, unlike the first exemplary embodiment, the imaging optical system 5 according to the present exemplary embodiment is configured to cause the surface to be scanned 6 to be scanned at an uneven speed with the light flux deflected by the deflection surface 4a, i.e., dissatisfy the fθ characteristic in the main-scanning cross-section.

The optical surfaces should be formed into largely different shapes between an on-axis image height and an off-axis image height in the main-scanning cross-section to allow the imaging optical system 5 to have the fθ characteristic, like the first exemplary embodiment. Then, placing the imaging optical system 5 too close to the deflector 4 leads to a sharp change in the shape of the optical surface in the main-scanning cross-section, resulting in an increase in comatic aberration. Therefore, the imaging optical system 5 should be disposed a certain distance away from the deflector 4 to maintain both the optical performance and the fθ characteristic of the imaging optical system 5.

On the other hand, in the present exemplary embodiment, the imaging optical system 5 is configured to have such a scanning characteristic that the light flux does not satisfy the evenness of the speed on the surface to be scanned 6, which allows the imaging optical system 5 to be disposed further close to the deflector 4 while maintaining the optical performance, thereby realizing a further reduction in the size of the entire apparatus.

The scanning characteristic of the imaging optical system 5 according to the present exemplary embodiment is expressed by the following expression (14), when θ represents a scanning angle (a scanning field angle) by the deflector 4, Y [mm] represents a light condensing position (an image height) of the light flux deflected with the scanning angle θ on the surface to be scanned 6 in the main-canning direction, and f [mm] represents an imaging coefficient at the on-axis image height.

$$Y = f \times \theta + \alpha \times \theta^3 \quad (14)$$

However, the imaging coefficient f is a coefficient corresponding to f in the fθ characteristic: Y=fθ, which is the scanning characteristic when the parallel light flux is incident on the imaging optical system 5, and is a coefficient for expanding the fθ characteristic to a light flux other than the parallel light flux. In other words, the imaging coefficient f is a coefficient for establishing a proportional relationship between the light condensing position Y and the scanning angle θ when light fluxes having all kinds of convergence including the parallel light flux are incident on the imaging optical system 5. In the present exemplary embodiment, the imaging coefficient f at the on-axis image height is f=106.7.

Further, α in the expression (14) is a coefficient (a scanning characteristic coefficient) for determining the scanning characteristic of the imaging optical system 5 according to the present exemplary embodiment, and is α=12.6 in the present exemplary embodiment. For example, if the coefficient α is 0, the expression (14) is expressed as Y=fθ, and therefore corresponds to the fθ characteristic. However, if the coefficient α is not 0, the expression (14) corresponds to such a scanning characteristic that the proportional relationship is not established between the light condensing position Y and the scanning angle θ. The expression that expresses the scanning characteristic of the imaging optical system 5 is not limited to the above-described expression (14).

Then, by differentiating the expression (14) with respect to the scanning angle θ, a scanning speed of the light flux on the surface to be scanned 6 with respect to the scanning angle θ can be acquired, as indicated by the following expression (15).

$$dY/d\theta = f + 3\alpha \times \theta^2 \quad (15)$$

Further, by dividing the expression (15) by dY(0)/dθ=f, which is a speed at the on-axis image height, the following expression (16) is acquired.

$$(dY/d\theta)/f = 1 + 3\alpha \times \theta^2/f \quad (16)$$

The expression (16) indicates a deviation amount of the evenness of the speed at each off-axis image height from the evenness of the speed at the on-axis image height, i.e., a deviation amount of a partial magnification (a deviation of a partial magnification) at the off-axis image height from a partial magnification at the on-axis image height. The optical scanning apparatus 40 according to the present exemplary embodiment has a partial magnification, so that α≠0 means that the scanning speed of the light flux is different between at the on-axis image height and at the off-axis image height. In other words, the scanning position (a scanning distance per unit time) at the off-axis image height is stretched according to the deviation of the partial magnification, whereby optically scanning the surface to be scanned 6 without taking into consideration this deviation of the partial magnification leads to deterioration of the image formed on the surface to be scanned 6 (deterioration of the printing performance).

Therefore, in the present exemplary embodiment, a modulation timing (a light emission timing) and a modulation duration (a light emission duration) of the light source 1 are controlled by a control unit (not illustrated) according to the deviation of the partial magnification if the coefficient α is α≠0. This control allows the optical scanning apparatus 40 to electrically correct the scanning position and the scanning time on the surface to be scanned 6, thereby allowing the optical scanning apparatus 40 to correct the deviation of the partial magnification and thus the deterioration of the image, acquiring a printing performance as excellent as that obtained when the fθ characteristic is satisfied.

As clearly understood from a comparison between FIGS. 1A, 1B, 2A, and 2B, and FIGS. 4A and 4B, in the present exemplary embodiment, the distance between the imaging optical system 5 and the deflection surface 4a can be shorter, and the width of the imaging optical system 5 in the main-scanning direction can also be considerably narrower compared with the first exemplary embodiment and the comparative example. However, as described above, it is difficult to reduce the distance Lo between the deflection surface 4a and the surface to be scanned 6 on the optical axis because of the necessity of securing the area for placing the toner container and the like, and therefore this distance is almost equal between the present exemplary embodiment and the comparative example. Therefore, the absolute value |βso| of the sub-scanning magnification of the imaging optical system 5 is larger in the present exemplary embodiment than the comparative example as this value is 5.62 times in the present exemplary embodiment while being 2.4 times in the comparative example.

Therefore, similarly to the first exemplary embodiment, in the present exemplary embodiment, the sub-scanning magnification of the incident optical system 2 and the layout of each of the members are also appropriately set so as to satisfy the above-described conditional expressions (7) to (9), thereby allowing the optical scanning apparatus 40 to achieve both the reduction in the sub-scanning magnification of the entire optical system and the reduction in the size of the entire apparatus.

Specifically, the sub-scanning magnification |βsi| of the incident optical system 2 is 1.56 times, and the sub-scanning magnification |βs| of the entire optical system can be reduced down to 8.76 times. If the incident optical system 2 according to the present exemplary embodiment is replaced with the incident optical system 2 according to the comparative example, |βsi| is 2.40 times, so that the sub-scanning magnification |βs| of the entire optical system is increased to 13.49 times.

Further, the value of Li/Lo is 0.33 and the light flux width on the emission surface of the incident optical system 2 is 2.01 mm in the present exemplary embodiment, whereby the reduction in Li and the reduction in the light flux width can be realized compared to the comparative example. Further, in the present exemplary embodiment, the relationship between the distance Lo and the width A is Lo/A=0.60, and satisfies both the above-described conditional expressions (12) and (13).

[Image Forming Apparatus]

FIG. 5 is a schematic diagram (a view of a sub-scanning cross-section) illustrating main portions of an image forming apparatus 104 according to an exemplary embodiment of the present invention. The image forming apparatus 104 includes an optical scanning unit 100, which is the optical scanning apparatus according to any of the above-described individual exemplary embodiments.

As illustrated in FIG. 5, code data Dc output from an external apparatus 117, such as a personal computer, is input to the image forming apparatus 104. This code data Dc is converted into image data (dot data) Di by a printer controller 111 in the apparatus, and is input to the optical scanning unit 100. Then, a light flux 103 modulated according to the image signal Di is emitted from this optical scanning unit 100, and a photosensitive surface (a surface to be scanned) of a photosensitive drum 101 is scanned with this light flux 103 in the main-scanning direction. The printer controller 111 is in charge of not only the above-described conversion of the data but also control of each unit in the image forming apparatus 104, such as a motor 105, which will be described below.

The photosensitive drum 101 serving as an electrostatic latent image bearing member (a photosensitive member) is rotated by the motor 105 in a clockwise direction. Then, the photosensitive surface of the photosensitive drum 101 is displaced relative to the light flux 103 in the sub-scanning direction according to this rotation. A charging roller 102, which evenly charges the photosensitive surface, is disposed above the photosensitive drum 101 in abutment with the photosensitive surface. Then, the image forming apparatus 104 is configured in such a manner that the photosensitive surface charged by the charging roller 102 is irradiated with the light flux 103 from the optical scanning unit 100.

As described above, the light flux 103 is modulated based on the image signal Di, and the irradiation with this light flux 103 causes an electrostatic latent image to be formed on the photosensitive surface. This electrostatic latent image is developed as a toner image by a developing unit 107, which is disposed in abutment with the photosensitive surface on a further downstream side of the position irradiated with the light flux 103 in the rotational direction of the photosensitive drum 101.

The toner image developed by the developing unit 107 is transferred onto a sheet 112 serving as a transfer material by a transfer roller (a transfer unit) 108 disposed opposite from the photosensitive drum 101 below the photosensitive drum 101. The sheet 112 is contained in a sheet cassette 109 located in front of the photosensitive drum 101 (a right side in FIG. 5), but can also be fed manually. A sheet feeding roller 110 is disposed at an end of the sheet cassette 109, by which the sheet 112 in the sheet cassette 109 is fed onto a conveyance path.

The sheet 112 with the unfixed toner image transferred thereon is further conveyed to a fixing unit disposed behind the photosensitive drum 101 (a left side in FIG. 5). The fixing unit includes a fixing roller 113, which has a fixing heater (not illustrated) therein, and a pressing roller 114, which is disposed in pressure contact with this fixing roller 113. This fixing unit fixes the unfixed toner image on the sheet 112 by heating the sheet 112 conveyed from the transfer roller 108 while pressing this sheet 112 at a pressure contact portion between the fixing roller 113 and the pressing roller 114. Further, a sheet discharge roller 116 is disposed behind the fixing roller 113, and the sheet 112 with the toner image fixed thereon is discharged outward from the image forming apparatus 104.

The image forming apparatus 104 may be configured as a color image forming apparatus by being provided with a plurality of units as each of the optical scanning unit 100, the photosensitive drum 101, and the developing unit 107. Further, a color digital copying machine may be constructed by connecting a color image reading apparatus including a line sensor, such as a charge coupled device (CCD) sensor and a complementary metal-oxide semiconductor (CMOS) sensor, to the image forming apparatus 104 as the external apparatus 117.

EXEMPLARY MODIFICATIONS

Having described the typical exemplary embodiments and examples of the present invention, the present invention is not limited to these exemplary embodiments and examples, and these exemplary embodiments and examples can be combined, modified, and changed in various manners within the range of the spirit of the present invention.

For example, each of the above-described exemplary embodiments employs the configuration that optically scans the single surface to be scanned 6 with the light flux from the single light source 1, but the present invention is not limited thereto and may employ a configuration that simultaneously deflects light fluxes from a plurality of light sources by a single deflector to optically scan a plurality of surface to be scanned.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-231167, filed Nov. 26, 2015, which is hereby incorporated by reference herein in its entirety.

What is claimed is:

1. An optical scanning apparatus comprising:
a light source;
a deflector configured to deflect a light flux from the light source to scan a surface to be scanned in a main-scanning direction;
an incident optical system configured to guide the light flux from the light source to a deflection surface of the deflector; and
an imaging optical system configured to guide the light flux deflected by the deflector to the surface to be scanned,
wherein a scanning speed of the light flux is different between at an on-axis image height and at an off-axis image height on the surface to be scanned, and
wherein the optical scanning apparatus satisfies the following conditions:

$0.5 < |\beta si| < 2.2$, $3.0 < |\beta so| < 10.0$, and $0.2 < Li/Lo < 0.4$, where $\beta si$ represents a magnification of the incident optical system in a sub-scanning cross-section, $\beta so$ represents a magnification of the imaging optical system in the sub-scanning cross-section, Li represents a distance between the light source and the deflection surface on an optical axis, and Lo represents a distance between the deflection surface and the surface to be scanned on the optical axis.

2. The optical scanning apparatus according to claim 1, wherein, when A represents an effective scanning width on the surface to be scanned, the optical scanning apparatus satisfies a condition $0.38 \leq Lo/A \leq 0.75$.

3. The optical scanning apparatus according to claim 2, wherein the optical scanning apparatus satisfies a condition $0.5 \leq Lo/A \leq 0.75$.

4. The optical scanning apparatus according to claim 1, wherein the optical scanning apparatus satisfies a condition $1.0 < |\beta si| < 1.9$.

5. The optical scanning apparatus according to claim 1, wherein the optical scanning apparatus satisfies a condition $5.62 \leq |\beta so| < 10.0$.

6. The optical scanning apparatus according to claim 1, wherein the imaging optical system includes a single optical element.

7. The optical scanning apparatus according to claim 1, wherein at least one of the incident optical system and the imaging optical system includes a diffractive surface.

8. The optical scanning apparatus according to claim 1, wherein the incident optical system includes a single optical element.

9. The optical scanning apparatus according to claim 1, further comprising a control unit configured to control a light emission of the light source based on a deviation of a partial magnification of the imaging optical system.

10. An image forming apparatus comprising:
a light source;
a deflector configured to deflect a light flux from this light source to optically scan a surface to be scanned in a main-scanning direction;
an incident optical system configured to guide the light flux from the light source to a deflection surface of the deflector;
an imaging optical system configured to guide the light flux deflected by the deflector to the surface to be scanned;
a developing unit configured to develop, as a toner image, an electrostatic latent image formed on the surface to be scanned by this imaging optical system;

a transfer unit configured to transfer the developed toner image onto a transfer material; and a fixing unit configured to fix the transferred toner image onto the transfer material, wherein a scanning speed of the light flux is different between at an on-axis image height and at an off-axis image height on the surface to be scanned, and wherein the image forming apparatus satisfies the following conditions:

$0.5 < |\beta si| < 2.2,$ $3.0 < |\beta so| < 10.0,$ and $0.2 < Li/Lo < 0.4$ where βsi represents a magnification of the incident optical system in a sub-scanning cross-section, βso represents a magnification of the imaging optical system in the sub-scanning cross-section, Li represents a distance between the light source and the deflection surface on an optical axis, and Lo represents a distance between the deflection surface and the surface to be scanned on the optical axis.

11. An image forming apparatus comprising:

a light source;

a deflector configured to deflect a light flux from this light source to optically scan a surface to be scanned in a main-scanning direction;

an incident optical system configured to guide the light flux from the light source to a deflection surface of the deflector;

an imaging optical system configured to guide the light flux deflected by the deflector to the surface to be scanned; and a printer controller configured to convert a signal output from an external apparatus into image data to input the image data to the light source, wherein a scanning speed of the light flux is different between at an on-axis image height and at an off-axis image height on the surface to be scanned, and wherein the image forming apparatus satisfies the following conditions:

$0.5 < |\beta si| < 2.2,$ $3.0 < |\beta so| < 10.0,$ and $0.2 < Li/Lo < 0.4$ where βsi represents a magnification of the incident optical system in a sub-scanning cross-section, βso represents a magnification of the imaging optical system in the sub-scanning cross-section, Li represents a distance between the light source and the deflection surface on an optical axis, and Lo represents a distance between the deflection surface and the surface to be scanned on the optical axis.

* * * * *